United States Patent
Kato

[11] Patent Number: 5,966,161
[45] Date of Patent: Oct. 12, 1999

[54] OPTICAL ELEMENT AND A SCANNING OPTICAL APPARATUS USING THE SAME

[75] Inventor: Manabu Kato, Kawasaki, Japan

[73] Assignee: Canon Kabushiki Kaisha, Tokyo, Japan

[21] Appl. No.: 08/653,195

[22] Filed: May 24, 1996

[30] Foreign Application Priority Data

May 31, 1995 [JP] Japan .................................... 7-157178
Apr. 25, 1996 [JP] Japan .................................... 8-128963

[51] Int. Cl.$^6$ .............................. G02B 26/08; G02B 7/02
[52] U.S. Cl. ........................ 347/258; 347/259; 359/216; 359/820
[58] Field of Search ................................ 347/258, 259, 347/260, 261, 243, 241; 359/216, 218, 662, 212, 206; 250/561

[56] References Cited

U.S. PATENT DOCUMENTS

| | | | |
|---|---|---|---|
| 4,802,721 | 2/1989 | Fujita | 350/6.8 |
| 4,919,499 | 4/1990 | Aiba | 350/6.6 |
| 5,055,663 | 10/1991 | Morimoto et al. | 250/201.4 |
| 5,155,616 | 10/1992 | Yamaguchi et al. | 359/216 |
| 5,172,154 | 12/1992 | Katagishi et al. | 354/402 |
| 5,173,798 | 12/1992 | Naiki | 359/216 |
| 5,369,284 | 11/1994 | Bellio | 250/561 |
| 5,408,360 | 4/1995 | Nakanishi | 359/642 |
| 5,436,645 | 7/1995 | Uemura et al. | 346/107 |
| 5,600,476 | 2/1997 | Takada et al. | 359/206 |
| 5,689,374 | 11/1997 | Xu et al. | 359/652 |

FOREIGN PATENT DOCUMENTS

| | | |
|---|---|---|
| 461660 | 12/1991 | European Pat. Off. . |
| 580155 | 1/1994 | European Pat. Off. . |
| 61-190312 | 8/1986 | Japan . |
| 63-107822 | 5/1988 | Japan . |
| 5-188285 | 7/1993 | Japan . |
| 7-64005 | 3/1995 | Japan . |

OTHER PUBLICATIONS

A. Arimoto, et al., "Laser scanning system using a rotationally asymmetric aspheric surface", Applied Optics, vol. 30, No. 6, Feb. 20, 1991, pp. 699–704.

*Primary Examiner*—Peter S. Wong
*Assistant Examiner*—Rajnikant B. Patel
*Attorney, Agent, or Firm*—Fitzpatrick, Cella, Harper & Scinto

[57] ABSTRACT

An optical element and a scanning optical apparatus using the same capable of correcting for image plane re-positioning caused by internal distortion of the optical element, particularly, refractive index distribution caused by forming the optical element by plastic molding. The optical element has an internal refractive index distribution such that the focal length calculated based on the curvature of the plane thereof, the refractive index of the material, and the thickness along the optical axis, is shorter than the focal length actually measured. The element may be used in the scanning optical apparatus, may be provided with planes of different curvatures in a generating line and a line perpendicular thereto, and may be longer in the generating line.

26 Claims, 4 Drawing Sheets

OPTICAL ELEMENT AND A SCANNING OPTICAL APPARATUS USING THE SAME

BACKGROUND OF THE INVENTION

1. Field of the Invention

This invention relates to an optical element and a scanning optical apparatus using the same, and in particular to an optical element whose refractive index is distributed internally. Such an optical element is particularly well-suited for scanning optical apparatuses according to the invention, such as a laser beam printer having an electrophotographic process, or a digital copying machine, in which a light beam modulated and emitted from light source means is reflected by a deflector comprising a polygon mirror revolving, and the deflected beam scans a surface for recording via an image formation optical system as the fθ lens having fθ characteristics, whereby image information is recorded.

2. Description of the Related Art

Conventionally, in a scanning optical apparatus such as a laser beam printer, a light beam modulated in accordance with an image signal and emitted from light source means is periodically deflected by a deflector comprising a rotatable polygon mirror, and the deflected beam is converged into a beam spot on the surface of a photosensitive recording medium such as a photosensitive drum by an image formation optical system having fθ characteristics, so that the beam spot scans the surface to record an image.

Figure 1:
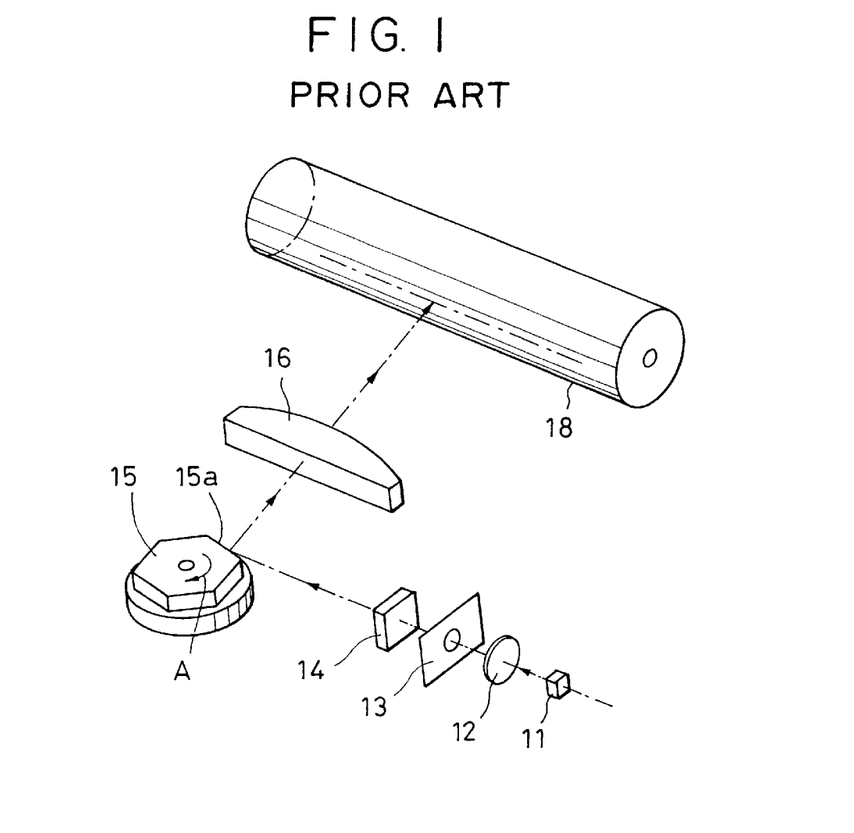
FIG. 1 is a schematic perspective view illustrating main components of a conventional scanning optical apparatus.

FIG. 1 is a schematic perspective view illustrating the main components of a conventional scanning optical apparatus.

In FIG. 1, a divergent light beam emitted from light source means 11 is formed into a substantially parallel beam by a collimator lens 12 to be controlled as to its light amount by a diaphragm 13 to be incident on a cylindrical lens 14 having a predetermined refractive power only in a subscan direction. The parallel beam incident on the cylindrical lens 14 passes through the lens as the parallel beam in a main scan section, while the parallel beam incident on the lens converges in a subscan section to form a substantially linear image on a deflection surface 15a as a reflection plane of a deflector 15 comprising a rotatable polygon mirror.

The beam deflected on the deflection surface 15a of the deflector 15 is guided onto a photosensitive drum surface 18 as a scanned surface via an image formation system 16 which has fθ characteristics, and the deflector 15 is revolved in the direction of the arrow A, so that the guided beam optically scans the photosensitive drum surface 18 to record image information.

Figure 2:
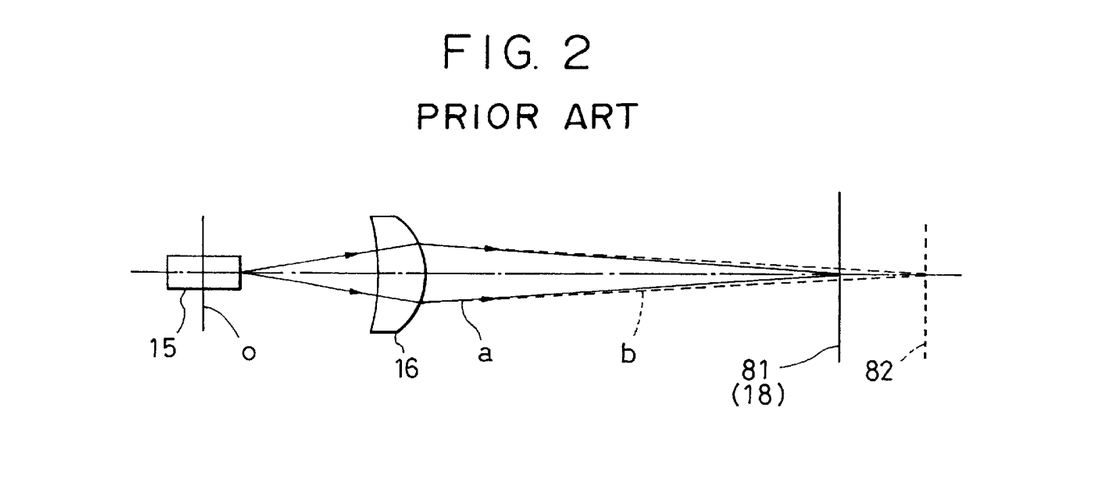
FIG. 2 is a section view illustrating the main components in a subscan direction of the conventional scanning optical apparatus.

FIG. 2 is a section view illustrating the main components in the subscan direction, which is perpendicular to the main scan direction including the optical axis of the fθ lens, shown only between the deflector and the scanned surface of the conventional scanning optical apparatus.

In FIG. 2, the deflection surface of the deflector 15 and the photosensitive drum surface 18 as the scanned surface are substantially optically conjugate to each other, as to the fθ lens 16. Therefore, if there is any so-called surface inclination in the deflector, such inclination is corrected by forming the beam into an image in the same scan line on the photosensitive drum surface.

Conventionally, in designing a scanning optical apparatus, as shown in, for example, in Japanese Patent Application Laid-open No. 61-190312, there is proposed a scanning optical apparatus designed such that a Gaussian imaging plane 82 as a paraxial image plane is positioned in the back of the scanned surface (i.e., opposite to the deflector) in consideration of spherical aberration of the optical system. Such an arrangement positions a so-called "best image plane" 81 directly on the scanned surface 18. In other words, the optical apparatus is designed such that the focal length calculated based on the arrangement of the optical system, the curvature of its plane, its refractive index, and its thickness, is longer than the focal length actually measured.

In FIG. 2, solid lines represent the beam travelling to the best image plane 81, and a broken line represents the beam travelling to the Gaussian imaging plane 82. In this specification, the Gaussian imaging plane is the image plane calculated based on the position of an object, the position of the light source means, the curvature of the lens, the refractive index of the lens, the thickness of the lens, the position of the lens surface, and so forth.

Most recently, fθ lenses have been produced by plastic molding. Apparatuses using such lenses must therefore consider not only optical aberrations but also internal distortions caused by the plastic molding process.

In order to mold the lens without internal distortions, it is considered to cool the material of the lens, very slowly. This method however has a problem that lead time lengthens, and productivity deteriorates.

SUMMARY OF THE INVENTION

In accordance with a first aspect of the present invention, there is provided an optical element comprising such an internal refractive index distribution that the focal length, if calculated based on the curvature of the lens surface thereof, the refractive index of the material, and the thickness along the optical axis, is shorter than the focal length actually measured. Such an optical element is capable of correcting for a re-positioning of the image plane caused by internal distortions in the element, in particular, refractive index distribution occurring when the element is formed by plastic molding.

In accordance with a second aspect of the present invention, there is provided a scanning optical apparatus in which the shape in a subscan direction of the fθ lens is appropriately formed such that a Gaussian imaging plane in the subscan direction calculated based on the curvature of the lens surface, the refractive index of the material, the thickness along the optical axis, and so forth, is positioned closer to a deflector than to a scanned surface, whereby the apparatus is capable of correcting for a re-positioning of the image plane in the subscan direction caused by internal distortions in the fθ lens, in particular, index distribution of the fθ lens occurring when the lens is formed by plastic molding, and such that a best image plane with least wave front aberration is positioned over the scanned surface. By virtue of such an arrangement, even in the case of plastic molding with decreased lead time (for example, by decreasing lens height), which easily causes internal distortions of fθ lens, there is provided a scanning optical apparatus suitable with good quality imaging in which image plane re-positioning and curvature are reduced.

The optical element of the present invention comprises such an internal refractive index distribution that the focal length calculated based on the curvature of plane thereof, the refractive index of the material, and the thickness along the optical axis, is shorter than the focal length actually measured.

In particular, the optical element is characterized in that the element is formed by plastic molding.

The scanning optical apparatus of the present invention comprises: light source means; a deflector element; a first optical element for receiving a light beam emitted from the light source means and forming the beam into a linear image extending in a main scan direction on a deflection surface of the deflector element; and a second optical element for receiving the light beam deflected by the deflector element to form a spot image on a scanned surface, wherein a Gaussian imaging plane in a subscan direction is positioned between the deflector element and the scanned surface.

In particular, the second optical element is characterized in that the element is formed by plastic molding, and comprises a single lens.

DESCRIPTION OF THE PREFERRED EMBODIMENTS

Figure 3:
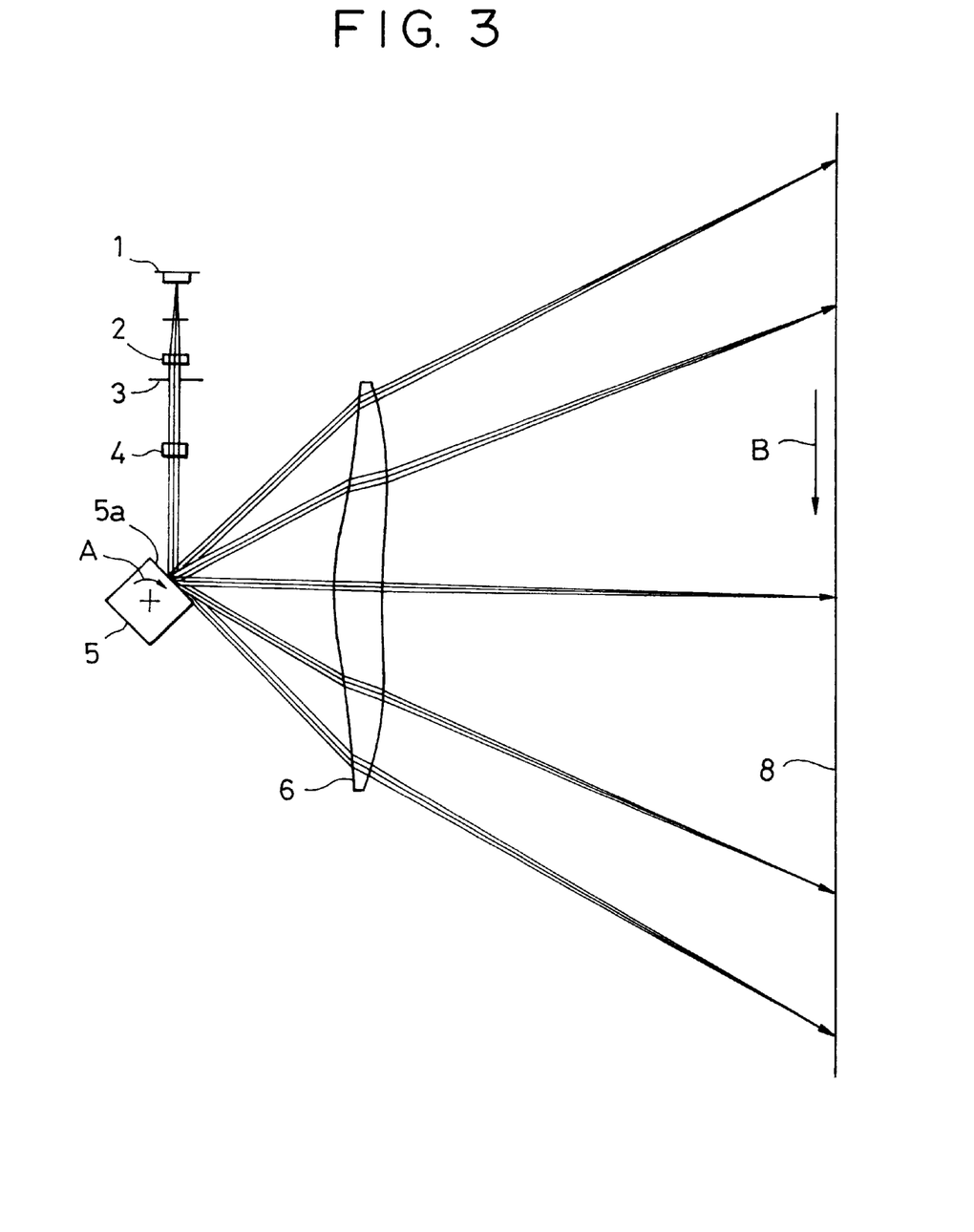
FIG. 3 is a section view illustrating main components extending in a main scan direction of a scanning optical apparatus as a first embodiment of the present invention.

FIG. 3 is a section view of the main components of the scanning optical apparatus as the first embodiment of the present invention. In FIG. 3, light source means 1 comprises, for example, a semiconductor laser which emits a light beam modulated in accordance with image information. A collimator lens 2 converts a divergent light beam emitted by the light source means 1 into a convergent beam. An aperture diaphragm 3 controls the beam passing through it, as to limit light quantity.

A cylindrical lens 4 is disposed perpendicular to the plane of FIG. 3, and has a predetermined refractive power only in the subscan direction to form substantially a linear image on a deflection surface 5a of a deflector 5, which is described below. In this arrangement, a first optical element comprises the collimator lens 2 and the cylindrical lens 4.

The deflector 5 comprises a deflection element such as a rotatable polygon mirror, and is revolved at a constant speed in the direction of the arrow A by driving means such as a motor (not shown).

A second optical element is comprised by fθ lens 6, which is an image formation optical system, constituted by one lens having fθ characteristics and having a shape which is described below. The beam deflected by the deflector 5, and modulated in accordance with image information, passes through the fθ lens 6 to form an image on a photosensitive drum surface 8 to be scanned, as a recording medium. At the fθ lens 6, inclination of the reflection plane is corrected. Further, as described below, fθ lens 6 has a refractive index distribution.

In the first embodiment, in order to shorten lead time, the fθ lens 6 is formed by plastic molding in such dimensions that its central thickness, d, is 11 mm, and its height in the subscan direction, h, is 9.6 mm, and so that the focal length obtained by calculation in the subscan direction (i.e., the direction of a line perpendicular to a generating line) is shorter than the focal length actually measured. One method for calculating the focal length is given below, and relies on the curvature of the lens, the refractive index of the lens material, and its thickness along the optical axis. Because the calculated focal length is shorter than the measured focal length, a Gaussian imaging plane in the subscan direction is positioned between the deflector 5 and the photosensitive drum surface 8. In such a manner, the fθ lens 6 satisfies the following relation:

$$d > h$$

where d represents the central thickness of a lens; and h, the height of the lens in the subscan section having the optical axis, perpendicular to the main scan section.

In the first embodiment, the divergent beam emitted from the light source means 1 as the semiconductor laser is converted by the collimator lens 2 into the convergent beam, which is controlled as to its light quantity to be incident on the cylindrical lens 4. The beam incident on the cylindrical lens 4 passes unchanged through the lens 4 in the main scan section, while the beam in the subscan section converges, so as to form substantially a linear image on the deflection surface 5a of the deflector 5, i.e., a longitudinal image in the main scan direction. The beam deflected on the deflection surface 5a of the deflector 5 is guided onto the photosensitive drum surface 8 through the fθ lens 6 having different refractive powers in the main scan direction and the subscan direction, and the deflector 5 is revolved in the direction of the arrow A, whereby the guided beam optically scans the photosensitive drum surface 8 in the direction of the arrow B. In accordance with this manner, an image is recorded.

In the first embodiment, the fθ lens 6 is formed such that its shape in the main scan direction is an aspheric surface as expressed in a function of up to the tenth degree, and its shape in the subscan direction is a spheric surface successively changing in the image height direction. For example, consider a situation in which the origin is defined by the intersection point between the fθ lens 6 and the optical axis; the x-axis is defined by the direction of the optical axis; the y-axis is defined in the main scan section as an axis perpendicular to the optical axis; and the z-axis is defined in the subscan section as an axis perpendicular to the optical axis. With these definitions, the shape in the generating line direction corresponding to the main scan direction is expressed by the following equation:

$$X = \frac{Y^2/R}{1+(1-(1+K)(Y/R)^2)^{1/2}} + B_4 Y^4 + B_6 Y^6 + B_8 Y^8 + B_{10} Y^{10}$$

where R represents a radius of curvature; and K, $B_4$, $B_6$, $B_8$, and $B_{10}$ represent aspherical coefficients. On the other hand, the shape in the direction of the line perpendicular to the generating line corresponding to the subscan direction as a direction perpendicular to the main scan direction including the optical axis is expressed by the following equation:

$$S = \frac{Z^2/r'}{1+(1-(Z/r')^2)^{1/2}}$$

where r'=R(1+$D_2Y^2$+$D_4Y^4$+$D_6Y^6$+$D_8Y^8$+$D_{10}Y^{10}$).

Figure 4:
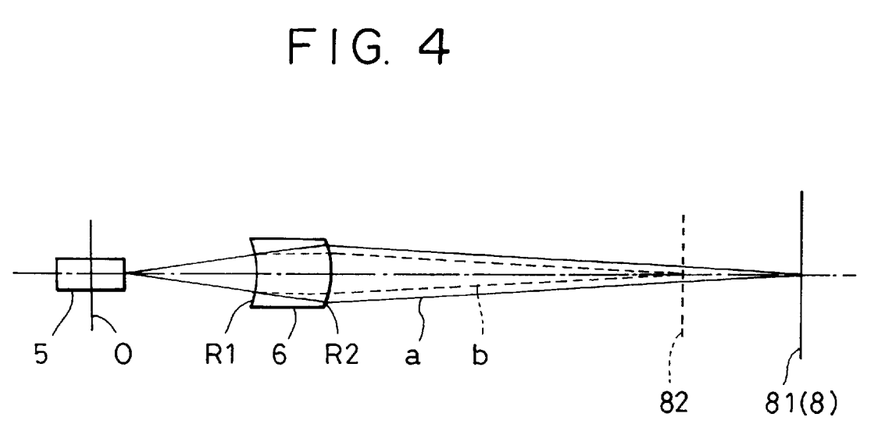
FIG. 4 is a section view illustrating the main components extending in a sub scan direction of the scanning optical apparatus as the first embodiment of the present invention.

FIG. 4 is a section view of the main components in the subscan direction, shown only between the polygon mirror 5 and the photosensitive drum surface 8. In FIG. 4, the same components as FIG. 3 are denoted by the same reference numerals.

In the first embodiment, as described above, in order to shorten the lead time, the fθ lens 6 is formed such that its lens height, h, is 9.6 mm, and is shorter than its central length, d, which is 11 mm, so that refractive index distribution of the fθ lens 6 appears in the subscan direction. This refractive index distribution causes the beam in the lens to be drawn toward the circumferential direction of the lens having a high refractive index. The lens is longer in the main scan section, thus it has almost no distortion. Further, in the subscan section, in an inclination correction optical system by which the deflector and the scanned surface are in a conjugate relation, the fθ lens has a larger power in the subscan direction to enhance re-positioning of the above-described image plane.

In order to mass-produce the fθ lenses with low cost, it is expected that the lenses would be formed by plastic molding; therefore the lenses are designed considering not only aberration but internal distortion inside the lenses caused by molding. In particular, in the case of shortening the lead time such that the length in the height direction of the plastic lens, h, is shorter than the central thickness, d, distortion is readily induced in the subscan section in the lens.

Figure 5:
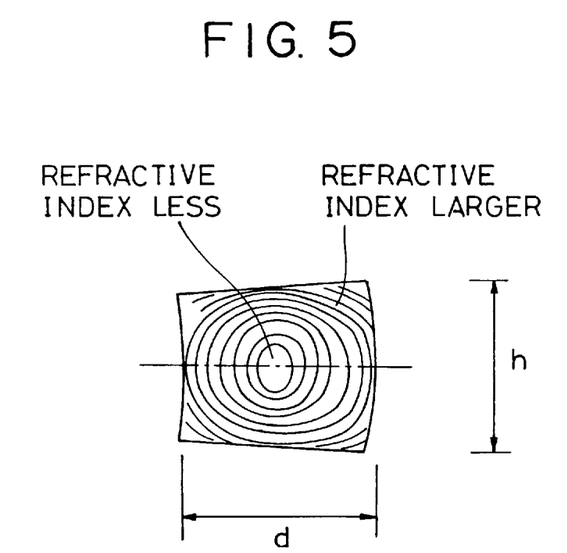
FIG. 5 is a schematic chart illustrating index inclination inside the fθ lens.

FIG. 5 is a schematic section view illustrating the refractive index distribution arising inside the fθ lens. In molding, generally, the circumferential regions of the lens (i.e., those regions closest to the mold) cool and solidify more quickly than interior regions of the lens. Thus the circumference has a density greater than the inside of the lens. Accordingly, the inside of the lens has a refractive index smaller than the circumference thereof. In FIG. 5, solid lines in the lens represent contour lines of the refractive indices, which show that the closer to the circumference, the greater the refractive index.

To solve such a problem, image plane re-positioning caused by the refractive index distribution is canceled by enhancing the curvature of a surface R2 of the fθ lens facing toward the photosensitive drum surface 8. In other words, by enhancing the curvature of the surface R2 of the fθ lens which faces toward the photosensitive drum surface 8, a Gaussian imaging plane 82 is formed between the deflector 5 and the photosensitive drum surface 8 (i.e., on the side of photosensitive drum 8 that faces the deflector 5, rather than on the opposite side as in conventional systems), making it possible to correct image plane re-positioning in the subscan direction caused by the internal distortion occurring when the fθ lens is formed by plastic molding. Consequently, the best image surface 81 is formed on the photosensitive drum surface 8, whereby high precision optical scanning is done. In FIG. 4, there are shown solid lines a representing the beam travelling to the best image surface 81, and broken lines b representing the beam travelling to the Gaussian imaging plane 82.

The following TABLE 1 shows numerical examples of the optical arrangement and aspherical coefficients of the fθ lens in the case as the first embodiment in view of the internal distortion of the fθ lens.

In the TABLE 1, as to the fθ lens, its focal length was calculated based on the curvature of its surface, the refractive index of its material, and its thickness along the optical axis. In this context, "refractive index of its material" refers to the nominal refractive index of the material forming the lens, without taking into consideration the refractive index distribution caused by, for example, a plastic molding piece.

On the other hand, its focal length was actually measured by the nodal slide method. The nodal slide method is often used for measuring the focal length of an optical component, as described in "Kogaku Sokutei Handobukku" (meaning "Optical Measurement Handbook") published by Asakura Shoten.

TABLE 1

(First Embodiment)

| | | | | SHAPE OF fθ LENS | |
|---|---|---|---|---|---|
| WAVELENGTH USED | λ(nm) | 780 | | 1ST SURFACE | 2ND SURFACE |
| REFRACTIVE INDEX OF fθ LENS | n | 1.519 | R | 6.7817E + 01 | 1.6154E + 02 |
| ANGLE OF INCIDENCE TO POLYGON MIRROR | θi | −90 | K | −1.6787E + 01 | −1.0814E + 02 |
| MAXIMUM ANGLE OF EMITTANCE FROM POLYGON MIRROR | θmax | 45 | B4 | −9.8604E + 07 | −2.2909E − 06 |
| fθ LENS - POLYGON MIRROR | e | 36 | B6 | 1.5479E − 11 | 7.1426E − 10 |
| CENTRAL THICKNESS OF fθ LENS | d | 11 | B8 | 8.7055E − 14 | −3.2030E − 13 |
| SCANNED SURFACE - fθ LENS | Sk | 111.5 | B10 | −4.7942E − 18 | 7.9836E − 17 |
| MAXIMUM EFFICIENT APERTURE OF fθ LENS | Ymax | 42 | r | −2.8531E + 01 | −1.1762E + 01 |
| FOCAL LENGTH OF fθ LENS IN MAIN SCAN SECTION | ft | 213.7 | D2S | 0.0000E + 00 | 2.6973E − 04 |
| CONVERGENCE OF COLLIMATOR LENS | fc | 317.3 | D4S | 0.0000E + 00 | −4.0384E − 07 |
| CONVERGENT POINT OF POLYGON MIRROR | | | D6S | 0.0000E + 00 | 2.7691E − 10 |
| HEIGHT OF fθ LENS | h | 9.6 | D8S | 0.0000E + 00 | −1.0150E − 13 |
| CALCULATED FOCAL LENGTH OF fθ LENS | fcal. | 31.499 | D10S | 0.0000E + 00 | 1.4974E − 17 |
| | | | D2E | 0.0000E + 00 | 3.0199E − 04 |
| IN SUBSCAN SECTION | | | D4E | 0.0000E + 00 | −4.6331E − 07 |
| MEASURED FOCAL | fmea. | 32.475 | D6E | 0.0000E + 00 | 3.3487E − 10 |

TABLE 1-continued (First Embodiment)

|  |  |  | SHAPE OF fθ LENS | |
|---|---|---|---|---|
| WAVELENGTH USED | λ(nm) | 780 | 1ST SURFACE | 2ND SURFACE |
| LENGTH OF fθ LENS IN SUBSCAN SECTION | | D8E | 0.0000E + 00 | −1.3045E − 13 |
| | | D10E | 0.0000E + 00 | 2.0645E − 17 |

Figure 6:
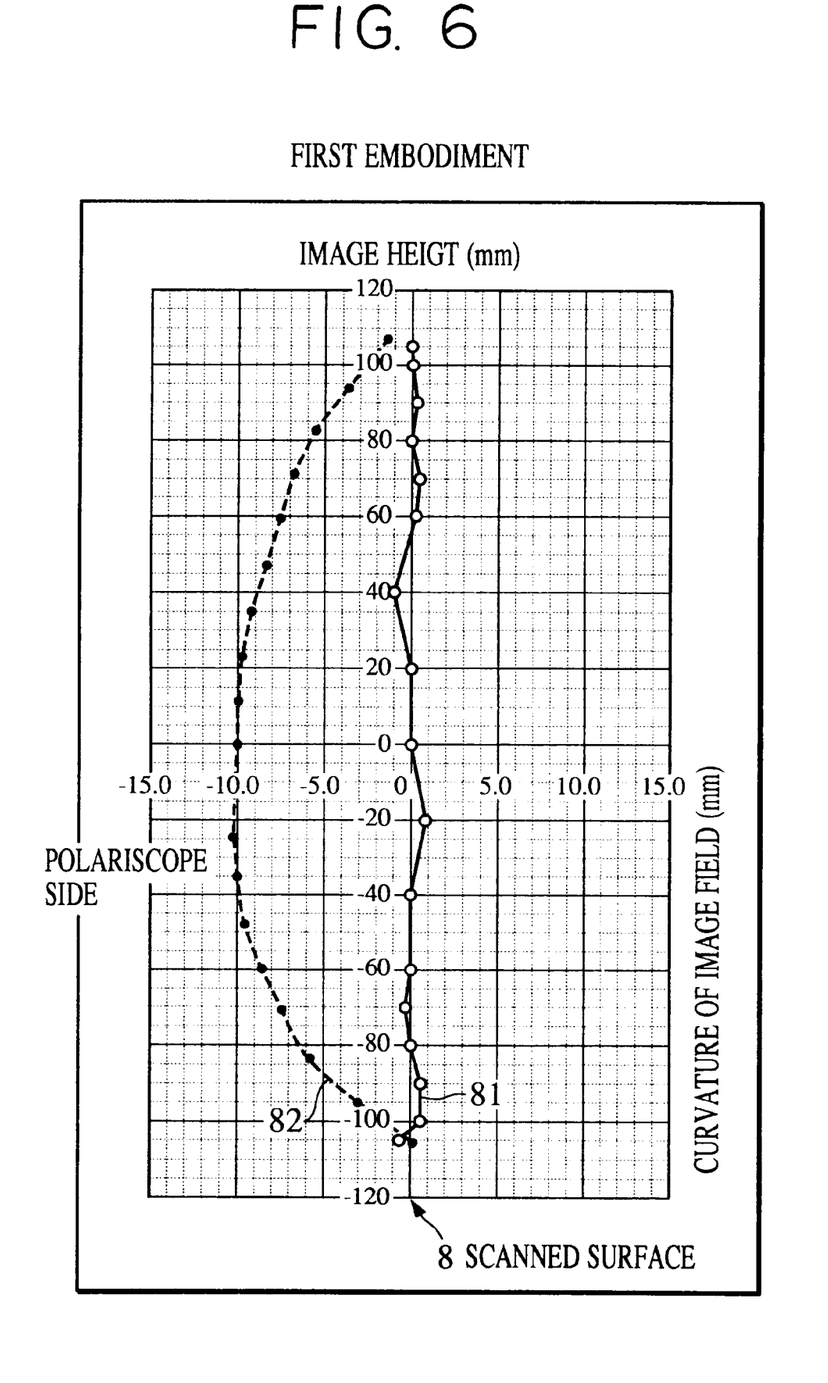
FIG. 6 is an explanatory chart illustrating a Gaussian imaging plane and a best image plane in the first embodiment of the present invention in which the internal distortion of the fθ lens is considered.

FIG. 6 is an explanatory chart illustrating the positional relation between the Gaussian imaging plane and the best image plane in the subscan direction in accordance with the first embodiment of the present invention in which the internal distortion of the fθ lens is considered.

In FIG. 6, a solid line represents the best imaging plane 81, and a broken line represents the Gaussian imaging plane 82.

As shown in FIG. 6, it is understood that the best imaging plane 81 is positioned substantially over the scanned surface in the first embodiment considering the refractive index distribution caused by the internal distortion, in which the Gaussian imaging plane 82 is positioned closer to the deflector than to the scanned surface. Further, an amount of the internal distortion of the fθ lens 6 changes depending upon molding conditions, accordingly the distance by which the image plane is repositioned changes, thus it hardly needs saying that the molding must be stabilized in carrying out the present invention. Re-positioning of the image plane is greatest in the center of the lens in which its thickness is greatest, but becomes smaller closer to the circumference.

As can be seen in the first embodiment, as described above, by increasing the refractive power of the surface R2 of the fθ lens 6 to the scanned surface, and positioning the Gaussian imaging plane 82 closer to the deflector 5 than to the scanned surface 8, it is possible to correct for image plane re-positioning in the subscan direction caused by the internal distortion occurring when the fθ lens is formed 6 by plastic molding, whereby it is possible to position the best imaging plane 81 with least wave front aberration, over the scanned surface 8. On the other hand, if the fθ lens has internal distortion caused by plastic molding intended for shortening lead time by decreasing the height of the fθ lens relative to the central thickness thereof, in accordance with such a method, it is possible to reduce re-positioning of the image plane caused by the internal distortion of the fθ lens, thereby making it possible to obtain a scanning optical apparatus suitable for fine imaging with reduced image plane re-positioning and curvature.

The following TABLE 2 shows numerical examples of the optical arrangement and aspherical coefficients of the fθ lens, in accordance with the second embodiment.

The difference from the first embodiment is that image plane re-positioning is corrected by using the surface R1 of the fθ lens, i.e., the surface that faces toward the deflector. The other arrangements and optical operations are similar to those of the first embodiment.

In other words, in the second embodiment, both of the surfaces R1 and R2 of the fθ lens have curvatures in the line perpendicular to the generating line that the curvatures comprise spherical planes successively changing in the direction of the image height. As can be seen in the second embodiment, similar to the first embodiment, if the fθ lens has distortion caused by the plastic molding intended for shortening lead time by decreasing the height of the fθ lens relative to the central thickness thereof, it is possible to obtain a scanning optical apparatus suitable for fine imaging with reduced image plane re-positioning and curvature.

TABLE 2

(Second Embodiment)

|  |  |  |  | SHAPE OF fθ LENS | |
|---|---|---|---|---|---|
| WAVELENGTH USED | λ(nm) | 780 | | 1ST SURFACE | 2ND SURFACE |
| REFRACTIVE INDEX OF fθ LENS | n | 1.519 | R | 6.7817E + 01 | 1.6154E + 02 |
| ANGLE OF INCIDENCE TO POLYGON MIRROR | θi | −90 | K | −1.6787E + 01 | −1.0814E + 02 |
| MAXIMUM ANGLE OF EMITTANCE FROM POLYGON MIRROR | θmax | 45 | B4 | −9.8604E − 07 | −2.2909E − 06 |
| fθ LENS - POLYGON MIRROR | e | 36 | B6 | 1.5479E − 11 | 7.1426E − 10 |
| CENTRAL THICKNESS OF fθ LENS | d | 11 | B8 | 8.7055E − 14 | −3.2030E − 13 |
| SCANNED SURFACE - fθ LENS | Sk | 111.5 | B10 | −4.7942E − 18 | 7.9836E − 17 |
| MAXIMUM EFFICIENT APERTURE OF fθ LENS | Ymax | 42 | r | −2.9912E + 01 | −1.1991E + 01 |
| FOCAL LENGTH OF fθ LENS IN MAIN SCAN SECTION | ft | 213.7 | D2S | −5.7225E − 05 | 2.6552E − 04 |
| CONVERGENCE OF COLLIMATOR LENS | fc | 317.3 | D4S | 3.0357E − 08 | −4.2763E − 07 |
| CONVERGENT POINT | | | D6S | −3.1337E − 12 | 3.0447E − 10 |

TABLE 2-continued (Second Embodiment)

|  |  |  | SHAPE OF fθ LENS | |
|---|---|---|---|---|
| WAVELENGTH USED | λ(nm) | 780 | 1ST SURFACE | 2ND SURFACE |
| OF POLYGON MIRROR |  |  |  |  |
| HEIGHT OF fθ LENS | h | 9.6 | D8S  −5.1665E − 15 | −1.0150E − 13 |
| CALCULATED FOCAL | fcal. | 31.499 | D10S  1.6903E − 18 | 1.7245E − 17 |
| LENGTH OF fθ LENS |  |  | D2E  −1.0582E − 04 | 2.8012E − 04 |
| IN SUBSCAN SECTION |  |  | D4E  1.8421E − 07 | −4.4176E − 07 |
| MEASURED FOCAL | fmea. | 32.475 | D6E  −1.9224E − 10 | 3.1586E − 10 |
| LENGTH OF fθ LENS |  |  | D8E  9.8305E − 14 | −1.2177E − 13 |
| IN SUBSCAN SECTION |  |  | D10E  −1.9109E − 17 | 1.9127E − 17 |

In both embodiments, internal distortions are created in the fθ lens because the lead time for producing the lens is short.

Therefore, in the first embodiment, the actually measured focal length of the fθ lens is 32.475 mm. Accordingly, the focal length of the fθ lens is designed so as to agree with a distance to the scanned surface such that the calculated focal length is 31.499 mm, which is approximately 1 mm shorter than the actually measured focal length.

Now, in the case that the internal distortion does not occur in the fθ lens, such as when the lead time is not decreased, the calculated focal length is approximately equal to the actually measured focal length.

For example, when the actually measured focal length is 32.475 mm, and the calculated focal length is in the range of 32.375 mm to 32.575 mm, it is considered that the internal distortion does not occur as shown below:

32.375 mm/32.475 mm=0.9969≈0.997

More precisely, when the calculated focal length is more than 0.3% shorter than the actually measured focal length, it is considered that the internal distortion occurs.

Therefore, when the calculated focal length is shorter than 99.7% of the actually measured focal length, it is considered that the optical element is designed in accordance with the present invention, considering the internal distortion.

Further, in the first embodiment, the calculated focal length (31.499 mm) of the fθ lens is designed so as to be approximately 1 mm shorter than the actually measured focal length (32.475 mm).

This difference of the focal length of 1 mm causes the Gaussian imaging plane 82 to be positioned 10 mm closer to the deflector than to the best image plane 81.

As described above, when the difference between the calculated focal length and the actually measured focal length is within 0.1 mm, it is considered that the internal distortion does not occur.

In accordance with these relations between the focal length and the image plane, it is considered that the internal distortion does not occur when the positional difference of the Gaussian imaging plane and the best image plane is within 0.1 mm.

In other words, when the Gaussian imaging plane is positioned not less than 1 mm closer to the best image plane, it is considered that the internal distortion occurs.

Therefore, when the Gaussian imaging plane is positioned not less than 1 mm closer to the best image plane, it is considered that the optical element is designed in accordance with the present invention, considering the internal distortion.

Both embodiments have been described using the fθ lens as the optical element, with the fθ lens having different curvatures in the direction of the generating line as the main scan direction and the direction of the line perpendicular thereto as the subscan direction, and being longer in the direction of the generating line. However, the present invention can be applied to an optical element having the same curvatures in the directions of the generating line and the line perpendicular thereto.

In other words, the present invention can be applied to all optical elements produced by plastic molding.

Further, in the described embodiments, the scanning optical apparatuses include an inclination correction function. However, it is to be understood that the present invention can be applied to a scanning optical apparatus that does not include an inclination correction function.

Therefore, the present invention can be applied to all scanning optical apparatuses using optical elements produced by plastic molding.

In accordance with the present invention, there is provided an optical element in which the focal length calculated based on the curvature of the element, the refractive index of the material, and the thickness along the optical axis, is designed to be shorter than the focal length actually measured, whereby correction is made to image plane re-positioning caused by the internal distortion, in particular, refractive index distribution when the element is formed by plastic molding.

In accordance with the scanning optical apparatus of the present invention, as described in the foregoing, the fθ lens formed by plastic molding has its plane shape in the subscan direction appropriately designed such that the Gaussian imaging plane in the subscan direction calculated based on the curvature of the plane, the refractive index of the material, and the thickness along the optical axis, is positioned between the deflector and the scanned surface, whereby correction is made to image plane re-positioning in the subscan direction caused by the internal distortion occurring when the fθ lens 6 is formed by plastic molding, so that there is provided a scanning optical apparatus with fine optical scanning, capable of positioning the best image plane with least wave front aberration over the scanned surface.

Further, in accordance with such a method, in the case that distortion occurs in the fθ lens when formed by plastic molding intended for shortening the lead time by decreasing the lens height relative to the central thickness, image plane re-positions caused by the internal distortion of the fθ lens can be reduced, whereby there is provided a scanning optical apparatus with fine imaging in which image plane re-positioning and curvature are reduced.

What is claimed is:

1. An optical element having a measurable focal length and comprised by an optical material having an internal refractive index distribution, wherein a focal length calculated based on a curvature of plane thereof, a refractive index of the optical material, and thickness along the optical axis, is shorter than a focal length actually measured.

2. An optical element according to claim 1, wherein said optical element has different curvatures in the directions of a generating line and a line perpendicular thereto, and is longer in said generating line.

3. An optical element according to claim 2, wherein the focal length calculated in said line perpendicular to said generating line is shorter than the focal length actually measured.

4. An optical element according to claim 1, wherein said optical element is formed by plastic molding.

5. An optical element according to claim 1, wherein said optical element satisfies the following relation:

$$d > h$$

where d represents the central thickness of said optical element; and h, the height of said optical element.

6. A scanning optical apparatus comprising:
light source means;
deflector means for deflecting a light beam emitted from said light source means;
a first optical element for receiving said light beam emitted from said light source means and forming the beam into a linear image extending in a main scan direction on a deflection surface of said deflector means; and
a second optical element for receiving said light beam deflected by said deflector means to form a spot image on a scanned surface,
wherein a Gaussian imaging plane in a subscan direction of said scanning optical apparatus is positioned between said deflector means and said scanned surface.

7. A scanning optical apparatus according to claim 6, wherein said Gaussian imaging plane in said subscan direction is calculated based on position of said light source means, planes of said first and second optical elements, curvatures of the planes thereof, refractive indices of materials forming said first and second optical elements, and thicknesses along optical axes thereof.

8. A scanning optical apparatus according to claim 6, wherein said second optical element is comprised of optical material having an internal refractive index distribution, wherein a focal length thereof calculated in said subscan direction based on curvature of a plane thereof, refractive index of the optical material, and thickness along an optical axis thereof, is shorter than a focal length actually measured.

9. A scanning optical apparatus according to claim 6, wherein said second optical element has different curvatures in said main scan direction and said subscan direction, and is longer in said main scan direction.

10. A scanning optical apparatus according to claim 6, wherein said second optical element is formed by plastic molding.

11. A scanning optical apparatus according to claim 6, wherein said second optical element comprises a single lens.

12. A scanning optical apparatus according to claim 6, wherein said second optical element satisfies the following relation:

$$d > h$$

where d represents the central thickness of said second optical element; and h, the height of said second optical element.

13. A scanning optical apparatus comprising:
light source means;
deflector means for deflecting a light beam emitted from said light source means;
a first optical element for guiding said beam emitted from said light source means to said deflector means; and
a second optical element for receiving said beam deflected by said deflector means to form a spot image on a scanned surface,
wherein a Gaussian imaging plane in a subscan direction of said scanning optical apparatus is positioned between said deflector means and said scanned surface.

14. A scanning optical apparatus according to claim 13, wherein said Gaussian imaging plane in said subscan direction is calculated based on position of said light source means, planes of said first and second optical elements, curvatures of the planes thereof, refractive indices of the materials forming said first and second optical elements, and thicknesses along optical axes thereof.

15. A scanning optical apparatus according to claim 13, wherein said second optical element is comprised of optical material having an internal refractive index distribution, wherein a focal length thereof calculated in said subscan direction based on curvature of a plane thereof, refractive index of the optical material, and thickness along an optical axis thereof, is shorter than a focal length actually measured.

16. A scanning optical apparatus according to claim 13, wherein said second optical element has different curvatures in said main scan direction and said subscan direction, and is longer in said main scan direction.

17. A scanning optical apparatus according to claim 13, wherein said second optical element is formed by plastic molding.

18. A scanning optical apparatus according to claim 13, wherein said second optical element comprises a single lens.

19. A scanning optical apparatus according to claim 13, wherein said second optical element satisfies the following relation:

$$d > h$$

where d represents the central thickness of said second optical element; and h, the height of said second optical element.

20. A laser printer apparatus comprising:
light source means;
deflector means for deflecting a light beam emitted from said light source means;
a first optical element for guiding said beam emitted from said light source means to said deflector means;
a recording medium; and
a second optical element for receiving said beam deflected by said deflector means to form a spot image on the surface of said recording medium,
wherein a Gaussian imaging plane in a subscan direction of said laser printer apparatus is positioned between said deflector means and the surface of said recording medium.

21. A laser printer apparatus according to claim 20, wherein said Gaussian imaging plane in said subscan direction is calculated based on position of said light source means, planes of said first and second optical elements, curvatures of the planes thereof, refractive indices of materials forming said first and second optical elements, and thicknesses along optical axes thereof.

22. A laser printer apparatus according to claim 20, wherein said second optical element is comprised of optical material having an internal refractive index distribution, wherein a focal length thereof calculated in said subscan direction based curvature of a plane thereof, refractive index of the optical material, and thickness along an optical axis thereof, is shorter than the focal length actually measured.

23. A laser printer apparatus according to claim 20, wherein said second optical element has different curvatures in said main scan direction and said subscan direction, and is longer in said main scan direction.

24. A laser printer apparatus according to claim 20, wherein said second optical element is formed by plastic molding.

25. A laser printer apparatus according to claim 20, wherein said second optical element comprises a single lens.

26. A laser printer apparatus according to claim 20, wherein said second optical element satisfies the following relation:

$$d > h$$

where d represents the central thickness of said second optical element; and h, the height of said second optical element.

* * * * *

UNITED STATES PATENT AND TRADEMARK OFFICE
CERTIFICATE OF CORRECTION

PATENT NO. : 5,966,161

DATED : October 12, 1999

INVENTOR(S) : Manabu KATO

It is certified that error appears in the above-identified patent and that said Letters Patent is hereby corrected as shown below:

DRAWING SHEET 4 of 4
Figure 6, "HEIGT" should read --HEIGHT--.

COLUMN 3
Line 25, "sub scan" should read --subscan--.

Signed and Sealed this

Sixth Day of February, 2001

Attest:

Q. TODD DICKINSON

*Attesting Officer*  *Director of Patents and Trademarks*